Aug. 11, 1970     J. P. KNIGHT     3,523,757
APPARATUS FOR PRODUCING CARBON BLACK
Filed Oct. 16, 1967
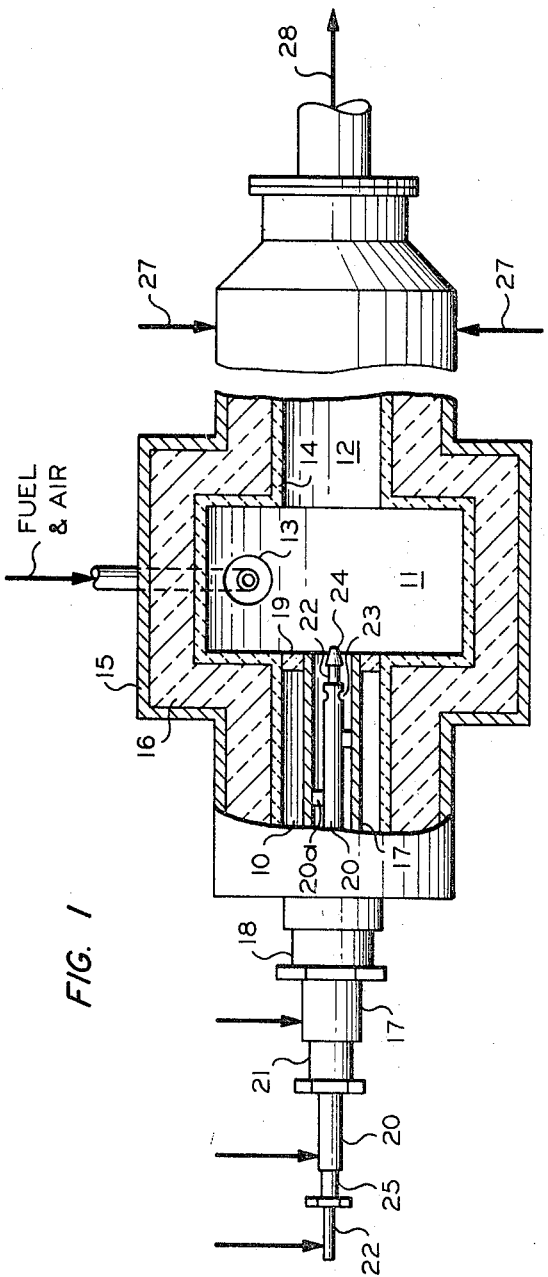
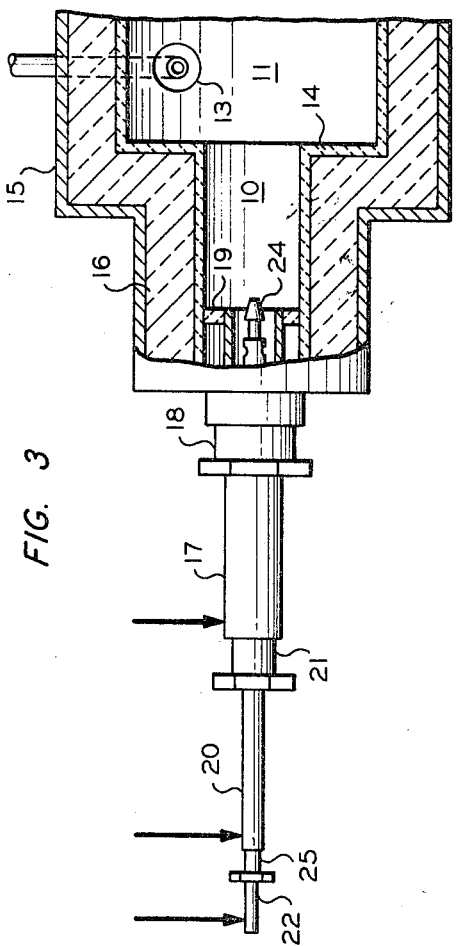
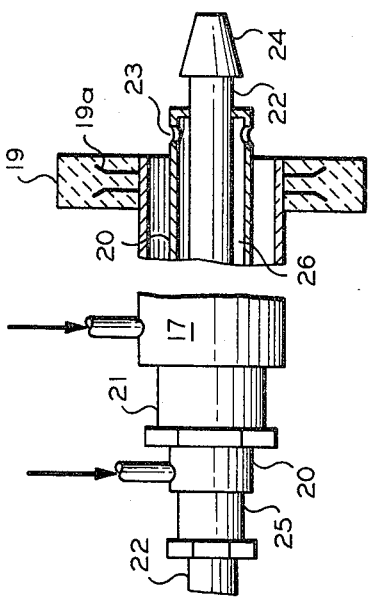
INVENTOR.
J. P. KNIGHT
BY *Young & Quigg*
ATTORNEYS 3,523,757
APPARATUS FOR PRODUCING CARBON BLACK
Jack P. Knight, Borger, Tex., assignor to Phillips
Petroleum Company, a corporation of Delaware
Filed Oct. 16, 1967, Ser. No. 675,518
Int. Cl. C09c *1/48;* C10b *47/04*
U.S. Cl. 23—259.5                                    7 Claims

ABSTRACT OF THE DISCLOSURE

An adjustable carbon black producing apparatus which is convertible from 2 to 3 axially aligned combustion zones for producing low, regular and high structure carbon blacks. The length of the upstream combustion zone can also be varied when producing the higher structure carbon blacks.

---

This invention relates to the production of carbon black by partial combustion and/or pyrolysis of a carbonaceous material. In another aspect, this invention relates to an improved apparatus for producing carbon black which can be adjusted to produce carbon blacks of both high and regular structural characteristics.

It is known in the prior art to produce carbon black by directing a hot oxidizing or combustion gas in a path adjacent the periphery of a generally cylindrical reaction zone and directing a reactant material axially into said zone inside the moving mass of hot gas. The reactant is thereby rapidly heated to a carbon black-forming temperature, e.g., in the range 2200 to 3500° F., and reacted in said zone to form carbon black, which is subsequently recovered. Processes of this type are illustrated in U.S. Pats., 2,375,795; 2,375,796; 2,375,797; and 2,375,798 (1945). Another process is disclosed in U.S. Pat. 2,564,-700 (1951), which uses two concentric cylindrical combustion zones.

The processes described above will produce the low structure and regular structure carbon blacks.

Structure, as applied to carbon black, is meant characteristics of the carbon black particles which relate to flocculation of the particles. While the classifications of structure in carbon black are relative, the commercial carbon blacks can be classified generally as high structure, normal structure, or regular structure, and low structure. Thus, when the structure is said to be high, there is a strong tendency for the particles to form chains of particles, and when the structure is said to be low, there is little tendency to form such chains.

Furnace carbon blacks having the above-stated high structure characteristics have several advantages in the compounding of rubber. For example, such high structure carbon blacks are easily compounded into the rubber. Also, the resulting rubber compounded with a high structure carbon black possesses superior extrusion properties.

Recently, a furnace-type process has been developed which involves the use of three axially aligned reaction zones and yields carbon blacks of high structural characteristics. This improved process generally comprises introducing a first stream of a free oxygen-containing gas into the upstream end of a generally cylindrical first zone having a length greater than its diameter; introducing a stream of a hydrocarbon feedstock into said first zone and into said free oxygen-containing gas therein at a point downstream from the point of introduction of said free oxygen-containing gas and upstream from the downstream end of said first zone; passing the resulting admixture from said first zone into a generally cylindrical second zone having a diameter greater than its length and greater than the diameter of said first zone, the upstream end of said second zone being in open communication with and axially aligned with the downstream end of said first zone; introducing a second stream of gas comprising a free oxygen-containing gas into said second zone to establish a mass of gas surrounding said admixture introduced from said first zone; passing said admixture from said second zone surrounded by said mass of gas into a generally cylindrical third zone having a length greater than its diameter and a diameter less than the diameter of said second zone; forming said carbon black product from said feedstock by decomposition of same under carbon black producing conditions in said first, second, and third zones; and separating said carbon black from the gaseous effluent from said third zone.

Preferably, the first stream of free oxygen-containing gas is introduced longitudinally into the upstream end of said first zone and the second stream of free oxygen-containing gas is introduced tangentially into the second zone to establish a rotating mass of gas in said second zone. The stream of feedstock is introduced into the first zone and into the first stream of free oxygen-containing gas at a point downstream from the point of introduction of the first stream of free oxygen-containing gas and upstream from the upstream end of the second zone. The resulting admixture from the first zone is then passed axially through the second zone, and axially into the third zone while surrounded by the rotating mass of gas from the second zone.

In one embodiment of this process, a stream of a fuel is introduced into admixture with the stream of air in the first zone at a point upstream from the point of introduction of the hydrocarbon feedstock. In still another embodiment, the introduction of this fuel into the first zone is omitted and the first stream of free oxygen-containing gas which is introduced into the second zone comprises a stream of hot combustible gases resulting from the substantially complete combustion of a combustible mixture of a fuel with an excess of air introduced into a tunnel combustion zone communicating with the second zone. Preferably, the tunnel combustion zone communicates tangentially with the second zone.

Generally speaking, as the amount of the axially introduced free oxygen-containing gas of the first stream is increased, the structure characteristics of the carbon black product also increases, i.e., there is obtained a carbon black product having a high structure.

Also, in this process, the point of introduction of the hydrocarbon feedstock into the first reaction zone has a definite effect on the structure characteristics of the carbon black product. Generally, as the point of introduction of said feedstock into said first reaction zone is moved upstream from the entrance of said second reaction chamber, there is obtained an increase in the structure characteristics of the carbon black product.

As can be readily seen, the application of the above process for producing high structure carbon black utilizes a reaction zone of a different configuration than the process disclosed in U.S. Patent 2,564,700. Thus, when it is desired to manufacture both high and regular structure carbon black, it was heretofore necessary to have different carbon black producing devices. Therefore, there is needed an apparatus that will not only produce the high structure carbon black with superior rubber-compounding properties, but also regular and low structure carbon blacks such as those produced by the above process disclosed in U.S. Pat. 2,564,700.

Therefore, one object of this invention is to provide an improved apparatus for making carbon black.

Another object of this invention is to provide an appartus that can be adjusted to make both high and regular structure carbon blacks.

Other objects and advantages of this invention will be readily apparent from a study of the disclosure.

According to one embodiment of this invention, there is provided a carbon black furnace that is adjustable to produce low, regular, and high structure carbon blacks.

In a preferred embodiment of this invention there is provided a carbon black furnace containing first, second and third axially aligned cylindrical reaction chambers with an air input conduit longitudinally positioned within the first or upstream reaction chamber and slidably mounted in a sealing means through the inlet thereof so that the outlet of said air conduit can be positioned at any longitudinal point in the first reaction zone; an annular disk made of metal or ceramic material but preferably made of ceramic material having an outer diameter slightly smaller than the diameter of the said first reaction chamber is attached adjacent the outlet of said air input conduit, the attachment being made on the inner diameter of the said annular disk; a carbon black feedstock introduction conduit is positioned longitudinally within said air introduction conduit and slidably mounted through a sealing means in the inlet portion of said air introduction conduit. Thus, the outlet ends of both the air introduction conduit and the carbon black feedstock introduction conduit can be positioned at any longitudinal point within the first reaction chamber, and the ceramic annular disk positioned on the outlet end of the air introduction conduit will effectively prevent any of the adjacent burning gases from passing behind the outlet end of the said air introduction conduit. Therefore, when both the air introduction conduit and the feedstock introduction conduit have been extended to a point near the outlet end of the first reaction chamber, the resulting reaction zones will have a similar configuration to the furnace disclosed in U.S. Pat. 2,564,700, and when the outlet end of the air introduction conduit is positioned near the inlet end of the first reaction zone, the resulting reactor will have a configuration similar to the above-mentioned improved furnace for producing high structure carbon black.

According to another more preferred embodiment of this invention, a fuel gas introduction conduit is positioned longitudinally and slidably mounted within the said air introduction conduit, and the carbon black feedstock introduction conduit is positioned longitudinally and slidably mounted within the fuel gas introduction conduit.

This invention can be more easily understood from a study of the drawings in which FIG. 1 is a diagrammatic illustration partly in section of the improved carbon black furnace of this invention. FIG. 2 is a view partly in section showing a detail of a preferred fluid injection means. FIG. 3 is an apparatus of FIG. 1 showing the fluid injection conduit in an alternate position.

Now referring to the drawing, and particularly to FIG. 1, there is shown the improved carbon black furnace of this invention comprising three cylindrical reaction chambers and appropriate fluid introduction conduits. Reaction chamber 10 comprises a cylindrical chamber preferably having a length greater than its diameter. Reaction chamber 11 is a cylindrical chamber having a diameter preferably greater than its length and greater than the diameter of reaction chamber 10. Reaction chamber 11 is in axial alignment with and connected at its upstream end to the downstream end of reaction chamber 10. At least one inlet tunnel 13 communicates with reaction chamber 11. In the embodiment described herein, inlet tunnel 13 communicates tangentially with reaction chamber 11. Reaction chamber 12 is a cylindrical chamber preferably having a length greater than its diameter and a diameter less than the diameter of reaction chamber 11. Reaction chamber 12 is in axial alignment with and connected at its upstream end to the downstream end of reaction chamber 11. All of the said three reaction chambers have a refractory lining 14 made of a highly refractory material such as sillimanite, alumina, or other refractory materials suitable for the purpose. A steel shell 15 containing insulating material 16 surrounds said refractory liner 14.

Air conduit 17 is shown slidably mounted through packing gland 18 disposed through the inlet of reaction chamber 10. Annular disk 19 is a disk preferably made of a ceramic material and has an inside diameter slightly greater than the diameter of air conduit 17 and an outside diameter slightly less than the diameter of reaction chamber 10.

Fuel conduit 20 is longitudinally positioned within air conduit 17 and slidably mounted through packing gland 21 in the inlet end of air conduit 17. Spacers 20a are positioned on the periphery of fuel conduit 20 and contact air conduit 17 to thereby hold fuel conduit 20 from the inside wall of air conduit 17 to thereby prevent the sagging of fuel conduit 20 within air conduit 17. It is preferred that the outlet end of fuel conduit 20 be enclosed around the periphery of feed conduit 22 and openings 23 be positioned adjacent the outlet end thereof to thereby inject streams of fuel gas into the flow of air that will flow through air conduit 17. Hydrocarbon feed conduit 22 having nozzle 24 on the outlet end thereof is longitudinally positioned within conduit 20 and slidably mounted through packing gland 25 in the inlet end of said conduit 20. In some operations it may be desirable to use only air conduit 17 and feed conduit 22. In the latter arrangement, spacers 20a will be positioned on feed conduit 22, and feed conduit 22 will be slidably mounted through a packing gland disposed in the inlet end of air conduit 17.

FIG. 2 is a view partly in section showing a preferred fluid injection means used with this invention. Annular disk 19 is shown attached to the periphery of the outlet end of air conduit 17 by jaggers 19a. Jaggers 19a are attached to the periphery of the outlet end of air conduit 17 by welding or other suitable means, and a disk of ceramic material 19 is molded thereon to form a firmly attached disk on the periphery of conduit 17. When attached in this manner, air conduit 17 can thereby be placed at any longitudinal point within reaction chamber 10 and annular disk 19 attached to the outlet end thereof will effectively plug the reaction chamber at any desired point of air discharge. Thus, with annular disk 19 attached to the periphery of air conduit 17, the reaction chamber 10 can be plugged at its downstream end as illustrated in FIG. 1 when air conduit 17 is extended as illustrated therein, or the reaction chamber 10 can be plugged at the upstream end thereof as illustrated in FIG. 3 when air conduit 17 is fully retracted. When in the position as illustrated in FIG. 1, the reactor will conform to the internal configuration disclosed in U.S. Pat. No. 2,564,700. When in the position as illustrated in FIG. 3, the reactor will conform to the improved three-zone reactor described above for producing high structure carbon black. It must also be noted, that annular disk 19 can be positioned at any point between the positions illustrated in FIG. 1 and FIG. 3, and both the fuel conduit 20 and the air conduit 22 can be longitudinally moved within reaction chamber 10 so that the outlet ends thereof will be positioned at any desired point therein. Also, if desired, a mortar or mud or clay slurry can be used to provide a means of lubrication between the outer periphery of disk 19 and chamber 10. The mud will then dry and provide an extra sealing effect. However, this invention will work effectively without the use of this mud or clay slurry.

In the operation of one embodiment of this invention, annular disk 19 and the outlet ends of conduits 17, 20, and 22 are positioned at any desired point within reaction chamber 10. A combustible mixture of the fuel and air, or air alone, is introduced into inlet tunnel 13 which preferably communicates tangentially with second combustion chamber 11. The fuel used in forming such combustible mixture can be any suitable fuel, any liquid, solid, or gases. Generally, a gaseous fuel, such as natural gas is preferred. Burning of said combustible mixture is initiated and substantially completed in inlet tunnel 13. Any portion of said mixture which is not burned in the said inlet tunnel is burned along the periphery of reaction chamber 11. Upon continued injection of combustible mixture into inlet tunnel 13, a combustible mixture (flame and combustion products) will exit therefrom and enter reaction chamber 1 and follow a spiral path around the same toward the axis thereof.

If annular disk 19 is positioned upstream of the outlet end of reaction chamber 10, a stream of air is introduced into air conduit 17 and flows longitudinally through reaction chamber 10, and on into reaction chamber 11. A stream of vaporous fuel, such as natural gas or vaporized liquid fuel, is passed through the annulus space 26 (see FIG. 2) between fuel conduit 20 and feed conduit 22 and exits substantially radially therefrom via openings 23 into admixture with said longitudinally flowing stream of air from conduit 17. It must be noted that if annular disk 19 is positioned in the downstream end of reaction chamber 10, then it may be desirable to only pass air and/or reactant feed into chamber 11 via conduits 17 and 22 respectively.

A reactant feed, such as hydrocarbon oil, passes through conduit 22, nozzle 24, and is introduced at a suitable angle into the mixture of vaporous fuel and air. The resulting admixture is then passed axially through reaction chamber 11 and enters reaction chamber 12 while surrounded by the hot combustion gases from the said reaction chamber 11. Formation of the carbon black product is concluded in reaction chamber 12 and passes therefrom suspended in combustion gases to carbon black recovery equipment (not shown). Before leaving reaction chamber 12, the reaction mixture is quickly cooled to a temperature below that at which carbon black formation takes place. This cooling is effected in a known manner by means of water introduced via conduits 27 which are here shown diagrammatically but which extend to the interior of section 12. The cooled product is then removed via conduit 28.

Thus, by the use of this invention, not only can the length of reaction chamber 10 be controlled as desired, but also the point of discharge of air, fuel, and carbon black feed within reaction chamber 10 or reaction chamber 11 can be controlled to yield carbon black having the desired structure characteristic. Therefore, by the use of this one apparatus, carbon blacks of varying structures can be produced. This was heretofore accomplished only by the use of completely different reactors.

The following example will serve to further illustrate this invention.

EXAMPLE

Test runs 2 through 6 below were conducted in a 3-chambered furnace similar to the furnace illustrated in FIG. 1 wherein the annular plug 19 was not positioned at the outlet of the first cylindrical reaction zone 10. In the reactor employed, the first cylindrical reaction zone 10 was twelve inches in diameter and 45 inches in length. The second cylindrical reaction zone 11 was 37 inches in diameter and 12 inches in length. The third cylindrical reaction zone was 12 inches in diameter.

The reaction zones used for the process of run 11 have the configuration as illustrated in FIG. 1 wherein annular plus 19 is positioned at the outlet of the first cylindrical reaction zone 10. Thus, cylindrical reaction zone 11 had a diameter of 37 inches and a length of 12 inches, and cylindrical reaction zone 12 was 12 inches in diameter.

The feedstock used was a conventional commercial aromatic concentrate feedstock prepared by liquid sulfur dioxide extraction of cycle oils obtained in the catalytic cracking of gas-oils. The feedstock had a BMCI value of 91. Typical properties of this feedstock are set forth in Table I:

TABLE I

Oil feedstocks

| | |
|---|---|
| Gravity, ° API | 11.4 |
| ASTM vac. dist. ° F. at 760 mm. Hg, percent condensed: | |
| 2 | 539 |
| 5 | 564 |
| 10 | 586 |
| 20 | 606 |
| 30 | 624 |
| 40 | 639 |
| 50 | 657 |
| 60 | 671 |
| 70 | 691 |
| 80 | 715 |
| 90 | 749 |
| 95 | 784 |
| BMCI [1] | 91 |
| Carbon, wt. percent | 89.0 |
| Hydrogen, wt. percent | 9.3 |

[1] Bureau of Mines Correlation Index.

The following series of runs illustrate the effect of positioning annular plug 19 at the outlet of first cylindrical reaction zone 10. The runs also illustrate the effect of changing the position of the point of introduction of the oil feedstock into the first cylindrical reaction zone 10. Operating conditions, yields of carbon black, and tests on the carbon black products are set forth in Table II below.

Run 1 illustrates the effect of operating the furnace as illustrated in FIG. 1 wherein the annular disk is positioned at the outlet of the first cylindrical reaction zone 10 to yield an internal furnace configuration of the two axially aligned cylindrical reaction zones as illustrated. Runs 2–6 illustrate the effect on the carbon black product when the distance between the oil feedstock discharge nozzle 24 and the entrance to the second cylindrical combustion zone 12 was incrementally increased.

TABLE II

| | Run No. | | | | | |
|---|---|---|---|---|---|---|
| | 1 | 2 | 3 | 4 | 5 | 6 |
| Oil charge: | | | | | | |
| Rate, gal./hr | 248 | 169 | 169 | 169 | 169 | 169 |
| Preheat, ° F | 550 | 550 | 550 | 550 | 550 | 550 |
| Nozzle location, inches [1] | 0 | 6 | 8 | 10 | 12 | 19 |
| Spray pressure | | 120 | 120 | 120 | 52 | 120 |
| Air and gas rates: | | | | | | |
| Axial air, Mc.f.h | [2] 4 | 75 | 75 | 75 | 75 | 75 |
| Tangential air, Mc.f.h | 250 | 75 | 75 | 75 | 75 | 75 |
| Axial air, percent of total air | 1.6 | 50 | 50 | 50 | 50 | 50 |
| Axial gas, Mc.f.h | 0 | 3.0 | 3.0 | 3.0 | 3.0 | 3.0 |
| Tangential gas, Mc.f.h | 16.7 | 5.0 | 5.0 | 5.0 | 5.0 | 5.0 |
| Total air/oil ratio, c.f./gal | 1,021 | 888 | 888 | 888 | 888 | 888 |
| Carbon black product: | | | | | | |
| Yield, lbs./gal | 3.05 | 3.25 | 2.86 | 2.86 | 2.84 | 2.74 |
| Photelometer | 90 | 91 | 92 | 91 | 96 | 93 |
| $N_2$ surface area, sq. m./g | 126.0 | 106.8 | 110.0 | 110.6 | 117.5 | 126.1 |
| Oil absorption, cc./g | 1.38 | 1.55 | 1.69 | 1.74 | 1.78 | 1.85 |

[1] Measured from upstream entrance to second combustion zone 11.
[2] Jacket air.

Samples of the carbon black products from runs 1 and 5 were compounded with a natural rubber to produce a series of rubber compositions. The following recipe employed in preparing said rubber composition was as follows:

| Components: | Parts by wt. |
|---|---|
| Liberian crepe | 100 |
| Carbon black | 50 |
| Zinc oxide | 5 |
| Altax [1] | 0.06 |
| Sulfur | 2.5 |
| Stearic acid | 3.0 |

[1] Benzothiazyl disulfide.

Said rubber compositions were each cured to a finished rubber by curing at 293° F. for thirty minutes. The resulting cured rubber compositions were tested in accordance with standard rubber testing procedures. The results of these tests are set forth below:

| Evaluation of carbon black in natural rubber | Run 1 | Run 5 |
|---|---|---|
| 300% modulus, p.s.i. | 2,240 | 2,590 |
| Tensile, p.s.i. | 3,400 | 2,640 |
| Elongation, percent | 430 | 320 |

From an examination of these tests, it will be noted that the 300% modulus value for the rubber containing the carbon black from run 5 was 350 pounds higher than the value from the rubber containing the carbon black from run 1, thus checking the increase to structural characteristics as shown by the increase of oil absorption values in Table II.

While certain embodiments of this invention have been described for illustrative purposes, the invention is not limited thereto. Various other modifications will be apparent to those skilled in the art in view of this disclosure.

I claim:

1. In an apparatus for producing carbon black comprising in combination a first cylindrical reaction chamber; a second cylindrical reaction chamber having a diameter greater than the diameter of the first cylindrical reaction chamber, the upstream end of said second cylindrical reaction chamber being in axial alignment and connected to the downstream end of said first cylindrical reaction chamber; at least one inlet means communicating with said second cylindrical reaction chamber; a third cylindrical reaction chamber having a diameter less than the diameter of the second cylindrical reaction chamber the upstream end of said third cylindrical reaction chamber being in axial alignment and connected to the downstream end of said second cylindrical reaction chamber, the improvement comprising a first fluid introduction conduit means being positioned longitudinally within said first reaction chamber with its outlet end positioned in the downstream direction thereof, said first fluid introduction conduit means being slidably mounted through a sealing means in the upstream end of said first reaction chamber; and an annular disc having an inside diameter slightly greater than the diameter of said first fluid introduction conduit means and an outer diameter slightly smaller than the inner diameter of said first reaction chamber, the inside diameter of said annular disc being connected to the periphery of said first fluid introduction conduit means adjacent outlet end thereof, said annular disk being movably positionable along the length of said first reaction chamber.

2. The apparatus of claim 1 wherein said annular disk is made of ceramic material.

3. The apparatus of claim 2 wherein said ceramic disk is molded to protrusions around the periphery of said first fluid introduction conduit means.

4. The apparatus of claim 1 further comprising a second fluid introduction conduit means having an inlet end and an outlet end, said second fluid introduction means being positioned longitudinally within said first fluid introduction conduit means and slidably mounted in the inlet end of said first fluid introduction means.

5. The apparatus of claim 4 further comprising a third fluid introduction conduit means having an inlet end and an outlet end and positioned longitudinally within said second fluid introduction conduit means, said third fluid introduction conduit means being slidably mounted in the inlet end of said second fluid introduction conduit means, and the outlet end of said third fluid introduction conduit means extending beyond the outlet end of said second fluid introduction conduit means.

6. The apparatus of claim 5 further comprising a first closure means closing said outlet end of said second fluid introduction conduit means around said third fluid introduction conduit means, and a plurality of peripheral openings in said second fluid introduction conduit means upstream from and adjacent said first closure means.

7. The apparatus of claim 6 further comprising a nozzle means attached to the outlet end of said third fluid introduction conduit means.

References Cited
UNITED STATES PATENTS

| | | | |
|---|---|---|---|
| 2,375,798 | 5/1945 | Krejci | 23—259.5 X |
| 2,864,673 | 12/1958 | Nannini | 23—295.5 |
| 2,976,127 | 3/1961 | Latham | 23—209.4 X |
| 3,003,854 | 10/1961 | Heller | 23—259.5 X |
| 3,013,865 | 12/1961 | Webster et al. | 23—259.5 |
| 3,079,236 | 2/1963 | Heller et al. | 23—259.5 X |
| 3,355,247 | 11/1967 | Krejci et al. | 23—259.5 X |
| 3,376,111 | 4/1968 | Stegelman | 23—259.5 X |
| 3,443,761 | 5/1969 | Groot | 23—259.5 X |

MORRIS O. WOLK, Primary Examiner

D. G. CONLIN, Assistant Examiner

U.S. Cl. X.R.

23—209.4, 209.6